United States Patent [19]

Masumoto et al.

[11] Patent Number: 4,684,414

[45] Date of Patent: Aug. 4, 1987

[54] HIGH DAMPING CAPACITY ALLOY AND A PROCESS FOR PRODUCING THE SAME

[75] Inventors: Hakaru Masumoto; Showhachi Sawaya; Masakatsu Hinai, all of Sendai, Japan

[73] Assignee: The Foundation: The Research Institute of Electric and Magnetic Alloys, Sendai, Japan

[21] Appl. No.: 551,902

[22] Filed: Nov. 15, 1983

Related U.S. Application Data

[63] Continuation of Ser. No. 286,624, Jul. 24, 1981, abandoned, which is a continuation-in-part of Ser. No. 180,563, Aug. 25, 1980, abandoned.

[30] Foreign Application Priority Data

Sep. 5, 1979 [JP] Japan .................................. 54-112762

[51] Int. Cl.⁴ .............................................. C22F 1/04
[52] U.S. Cl. ........................ 148/11.5 R; 148/11.5 A; 148/437; 148/442
[58] Field of Search .................. 148/11.5 A, 11.5 R, 148/2, 437, 442

[56] References Cited

U.S. PATENT DOCUMENTS 4,126,486 11/1978 Morris et al. ................. 148/11.5 A

OTHER PUBLICATIONS

Journal of Applied Physics, vol. 27, No. 6, Jun. 1956, Granatof and K. Kucke.
Metal Science Journal, 1968, vol. 2, by D. Birchon, D. E. Bromely and D. Healey.
Metal Science Journal, 1973, vol. 7, by Koichi Sugimoto, Takako Mori and Sumitaka Shiode.

Primary Examiner—R. Dean
Attorney, Agent, or Firm—Parkhurst & Oliff

[57] ABSTRACT

A high damping capacity alloy comprising of 0.3–20% by weight of Si and the remainder of Al and, as the case may be, further comprising of 0.1–50% by weight in total of at least one subingredient of Pb, Sb, Ge, Ce, Ni, Co, Fe, Nb, Zr, Ti, Ca and B, the alloy having a damping capacity of not less than $6 \times 10^{-3}$ after cold working with a reduction of area of at least 5%, and a process for producing the same.

4 Claims, 8 Drawing Figures

HIGH DAMPING CAPACITY ALLOY AND A PROCESS FOR PRODUCING THE SAME

This is a continuation of application Ser. No. 286,624 filed July 24, 1981, abandoned, which in turn is a continuation-in-part of application Ser. No. 180,563, filed Aug. 25, 1980, abandoned.

The present invention relates to high damping capacity aluminum-silicon base alloys suitable for preventing vibration and noise pollution created by various vehicles and large size machines, deterioration of performances in various precision instruments and electronic instruments due to vibration, and public nuisance resulting from various vibrations and noises under living environment.

In general, the damping capacity $Q^{-1}$ used for determining the damping performance of the alloy is related to vibrational energy $\Delta E$ decreased during one cycle of vibration and total vibrational energy E as expressed by the following equation:

$$Q^{-1} = \frac{1}{2\pi} \cdot \frac{\Delta E}{E}$$

That is, the larger the value of $Q^{-1}$, the amplitude of the vibration becomes smaller in a short period to exhibit a higher damping effect.

Heretofore, there have been known Fe-base alloys such as Gentalloy and the like, Mn-Cu alloys, Al-Cu-Ni alloys, Ni-Ti alloys and so on which have been used as a damping alloy. Among them, the Fe-base alloys and Mn-Cu alloys exhibit a high damping capacity, but have a large specific gravity of about 8 g/cm³, so they are unsuitable if it is intended to reduce the weight of instruments using them. On the other hand, the Al-Cu-Ni and Ni-Ti alloys are fairly hard to cold work.

It is, therefore, an object of the present invention to provide high damping capacity alloys having a light weight as compared with the conventional damping alloys. To accomplish the above objects, the alloys according to the present invention comprise 0.3–20% (preferably 1–20%) by weight of silicon and the remainder of aluminum having a small specific gravity of 2.7 g/cm³ or comprise 0.3–20% (preferably 1–20%) by weight of silicon, 0.1–50% by weight in total of at least one subingredient selected from the group consisting of less than 50% by weight of lead and antimony, less than 40% by weight of germanium and cerium, less than 20% by weight of nickel, less than 15% by weight of titanium and calcium and less than 3% by weight of boron and the remainder of aluminum, and is subjected to at least cold working with a reduction of area of at least 5% after heat treatment to increase dislocation thereof, whereby high damping capacity and high strength are imparted thereto owing to the hysteresis phenomenon of the dislocation.

Next, the production of the alloys according to the present invention will be described in detail below.

First of all, a starting material having the above mentioned composition range is melted in a conventional blast furnace in air or inert gas or under vacuum and thereafter sufficiently stirred to produce a homogeneous molten alloy. Then, the molten alloy is poured into a metal or sand mould to form an ingot.

According to the present invention, the resulting ingot is subjected to the following treatments.

(A) For the benefit of the homogenous solution treatment, the ingot is heated at an elevated temperature, for instance, a temperature higher than 250° C. and lower than its melting point, for as long a period as possible (preferably about 100 hours), and quenched or annealed at a cooling rate of not more than 1° C./sec. Then, the thus heat-treated ingot is subjected to a cold working such as forging, rolling, extruding, swaging, drawing or the like with a reduction of area of at least 5% in room temperature in order to obtain a high damping capacity.

(B) After the cold working with a reduction of area of at least 5% in step (A), the ingot is heated at a temperature of not more than 250° C. for as long a period as possible (preferably more than 5 minutes to less than 500 hours), and then cooled at a rate of not less than 1° C./hr, in which cooling can be carried out by quenching at a rate of 200° C./sec to 1° C./sec or by annealing at a rate of 1° C./sec to 1° C./hr.

Moreover, a shielding flux such as $MgCl_2$, borax, $CaF_2$, KCl and the like may be added in a total amount of not more than 5% and a deoxidizer such as magnesium, beryllium and the like may be added in an amount of not more than 0.5% in the melting of the starting material.

In step (A), the purpose of homogeneous solution treatment is to homogenize the ingredients of the ingot since the unhomogenization of ingredients in the ingot is caused by the temperature difference between the parts of the ingot and the difference of specific gravity between the solid and liquid phases during the solidification of the melt. In this phase, the heating time can be shortened when the heating temperature is raised, but when the weight of the resulting ingot is large, it is necessary to prolong the heating time with the raising of the heating temperature, while when the weight of the ingot is small, the heating may be made at a relatively lower temperature for a short time. This is based on the fact that the performances of the final product such as damping capacity and the like can be made uniform by a sufficient homogeneous solution treatment.

The cold working of Step (A) will increase the dislocation based on the working strain. This step is essential in order to obtain a high damping capacity by the hysteresis phenomenon of stress-strain curve caused by the movement of the dislocation so as to increase the tensile strength of the resulting product. Moreover, the improvement of the damping capacity is satisfactorily achieved only by the cold working with a reduction of area of at least 5%, but when the ingot contains a large amount of subingredients, it is often difficult to be subjected to a subsequent forming such as bending, deep drawing, punching or the like. Therefore, the heat treatment is carried out at a temperature of not more than 250° C. in step (B) after the cold working, whereby the subsequent forming such as deep drawing, punching or the like can be facilitated. In this case, the reason why the heating temperature is limited to not more than 250° C. is due to the fact that when reheating at a temperature of more than 250° C., the damping capacity deteriorates by decreasing the effect of cold working.

The present invention will be described with reference to the accompanying drawings, wherein.

The present invention will be explained with reference to the following examples.

A mixture of total weight of 100 grams having the composition as shown in the following Tables 1, 2 and 3 was melted in an alumina crucible in a high-frequency induction furnace while argon gas passed therethrough and then poured into an iron mould to obtain an ingot of 10 mm diameter. Next, the ingot was heated at 500° C. for 5 hours, annealed by a slow cooling, and then subjected to cold swaging and drawing to form a wire of 1.1 mm diameter, which was cut into specimens of 150 mm length. The measurement of the damping capacity $Q^{-1}$ was carried out by the inverted torsion pendulum method at a frequency of about 1 Hz and a maximum shear strain amplitude $\gamma_m$ of $10 \times 10^{-6}$.

Figure 1:
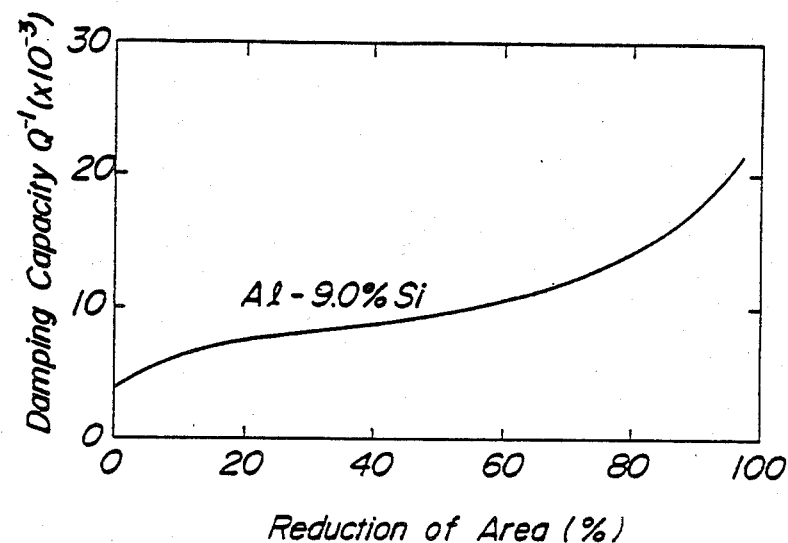
FIG. 1 is a graphical representation of a relationship between the damping capacity $Q^{-1}$ and the reduction of area in the Al-9% Si alloy after it is heated at 500° C. for 5 hours, annealed and subjected to a cold working.
Figure 2:
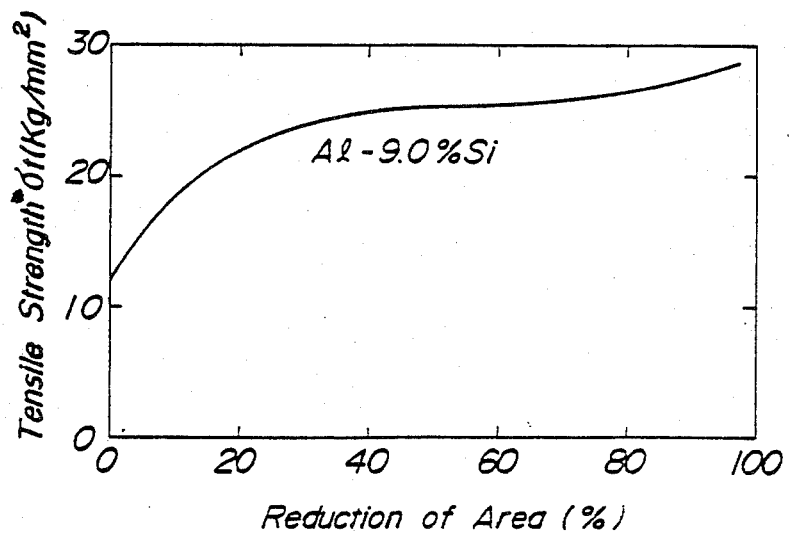
FIG. 2 is a graphical representation of a relationship between the tensile strength $\sigma_t$ and the cold working ratio in the same alloy a used in FIG. 1.

The damping capacity $Q^{-1}$ and strength of the Al-base alloy depend upon the reduction of area. For instance, the relationships of the reduction of area to the damping capacity $Q^{-1}$ and the tensile strength $\sigma_t$, after the Al-9% Si alloy is heated at 500° C. for 5 hours, annealed and subjected to cold swaging and drawing, are shown in FIGS. 1 and 2, respectively. As is apparent from these figures, the damping capacity $Q^{-1}$ and tensile strength $\sigma_t$ are increased with the increase of the cold working ratio, which exhibits such a result that the dislocation increases with the increase of the working strain. Thus, it can be seen that in order to obtain a damping capacity $Q^{-1}$ of not less than $6 \times 10^{-3}$ (at $\gamma_m = 10 \times 10^{-6}$), it is necessary that the cold working is carried out at a reduction of area of at least 5%.

The reduction of area and damping capacity $Q^{-1}$ of the Al-Si alloys are shown in Table 1. Further, the values of damping capacity $Q^{-1}$ of the alloys obtained by adding at least one subingredient to the Al-Si alloy and subjecting the alloy to a cold working with a reduction of area of 95% are shown in Tables 2 and 3.

TABLE 1

| Specimen No. | Si (% by weight) | Al | Cold working ratio (%) | Damping capacity $Q^{-1}$ ($\times 10^{-3}$) |
|---|---|---|---|---|
| | 0.0 | remainder | 95 | 4 |
| 1 | 3.0 | " | 95 | 23 |
| 2 | 3.0 | " | 71 | 13 |
| 3 | 7.0 | " | 95 | 23 |
| 4 | 9.0 | " | 95 | 20 |
| 5 | 11.0 | " | 95 | 20 |
| 6 | 13.0 | " | 95 | 20 |

TABLE 2

| Specimen No. | Si | Pb | Sb | Ge | Ce | Ni | Co | Fe | Nb | Zr | Ti | Ca | B | Al | Damping capacity $Q^{-1}$ ($\times 10^{-3}$) |
|---|---|---|---|---|---|---|---|---|---|---|---|---|---|---|---|
| | | | | | | (% by weight) | | | | | | | | | |
| 7 | 10.0 | 5.0 | — | — | — | — | — | — | — | — | — | — | — | remainder | 23 |
| 8 | 10.0 | — | 5.0 | — | — | — | — | — | — | — | — | — | — | " | 22 |
| 9 | 7.0 | — | — | 3.0 | — | — | — | — | — | — | — | — | — | " | 25 |
| 10 | 7.0 | — | — | — | 5.0 | — | — | — | — | — | — | — | — | " | 25 |
| 11 | 13.0 | — | — | — | — | 2.0 | — | — | — | — | — | — | — | " | 21 |
| 12 | 7.0 | — | — | — | — | — | 2.0 | — | — | — | — | — | — | " | 25 |
| 13 | 10.0 | — | — | — | — | — | — | 5.0 | — | — | — | — | — | " | 33 |
| 14 | 10.0 | — | — | — | — | — | — | — | 3.0 | — | — | — | — | " | 24 |
| 15 | 10.0 | — | — | — | — | — | — | — | — | 1.0 | — | — | — | " | 21 |
| 16 | 7.0 | — | — | — | — | — | — | — | — | — | 3.0 | — | — | " | 23 |
| 17 | 10.0 | — | — | — | — | — | — | — | — | — | — | 3.0 | — | " | 23 |
| 18 | 10.0 | — | — | — | — | — | — | — | — | — | — | — | 1.0 | " | 25 |

TABLE 3

| Specimen No. | Si | Pb | Sb | Ge | Ce | Ni | Co | Fe | Nb | Zr | Ti | Ca | B | Al | Damping capacity $Q^{-1}$ ($\times 10^{-3}$) |
|---|---|---|---|---|---|---|---|---|---|---|---|---|---|---|---|
| | | | | | | (% by weight) | | | | | | | | | |
| 19 | 7.0 | 2.0 | 1.0 | — | — | — | — | — | — | — | — | — | — | remainder | 26 |
| 20 | 7.0 | — | — | 3.0 | 1.0 | — | — | — | — | — | — | — | — | " | 27 |
| 21 | 10.0 | — | — | — | — | 1.0 | 1.0 | — | — | — | — | — | — | " | 24 |
| 22 | 10.0 | — | — | — | — | — | — | 5.0 | 1.0 | — | — | — | — | " | 34 |
| 23 | 7.0 | — | — | — | — | — | — | — | — | 1.0 | 1.0 | — | — | " | 23 |
| 24 | 7.0 | — | — | — | — | — | — | — | — | — | — | 1.0 | 1.0 | " | 26 |
| 25 | 3.0 | 2.0 | 1.0 | 1.0 | 1.0 | — | — | — | — | — | — | — | — | " | 25 |
| 26 | 3.0 | — | — | — | — | 0.5 | 0.5 | 3.0 | 0.5 | — | — | — | — | " | 30 |
| 27 | 3.0 | — | — | — | — | — | — | — | 1.0 | 1.0 | 1.0 | 1.0 | — | " | 27 |
| 28 | 3.0 | 1.0 | 0.5 | 0.5 | 0.5 | 0.5 | 0.5 | — | — | — | — | — | — | " | 25 |
| 29 | 3.0 | — | — | — | — | — | — | 2.0 | 0.5 | 1.0 | 1.0 | 1.0 | 1.0 | " | 32 |
| 30 | 3.0 | 0.5 | 0.5 | 0.5 | 0.5 | 0.5 | 0.5 | 1.0 | 0.5 | 0.5 | 0.5 | 0.5 | 0.5 | " | 30 |

As is apparent from the data of these tables, the aluminum article after the cold working with a reduction of area of 95% has a damping capacity $Q^{-1}$ of $4 \times 10^{-3}$, which is unsuitable as a damping material in light of the goal of the present invention. However, when more than 0.1% by weight of silicon as well as more than 0.1% by weight in total of at least one subingredient are added to the aluminum article, there can be obtained a damping capacity $Q^{-1}$ of not less than $6 \times 10^{-3}$. Furthermore, the Al-Si alloys have a fairly high damping capacity of $Q^{-1} = 13 \simeq 23 \times 10^{-3}$ (see Table 1), but the damping capacity is further improved to $Q^{-1} = 21 \simeq 34 \times 10^{-3}$ when at least one subingredient is added to the Al-Si alloy (see Tables 2 and 3). In brief, it will be understood that the damping capacity $Q^{-1}$ of the alloys according to the present invention is several tens of times the damping capacity of usual metals of $Q^{-1} = 1 \times 10^{-3}$.

Moreover, the specific gravity $\rho$ of the alloy according to the present invention is much smaller than that of usual metal, while the tensile strength $\sigma_t$ thereof is much higher than that of the cold worked aluminum article of $\sigma_t = 10$ kg/cm². For instance, the specimen No. 4 has $\sigma_t = 28$ kg/mm² and $\rho = 2.7$ g/cm³, the specimen No. 14 has $\sigma_t = 30$ kg/mm² and $\rho = 2.7$ g/cm³, the specimen No. 15 has $\sigma_t = 29$ kg/mm² and $\rho = 2.8$ g/cm³, and the specimen No. 26 has $\sigma_t = 30$ kg/mm² and $\rho = 3.0$ g/cm³.

Figure 4:
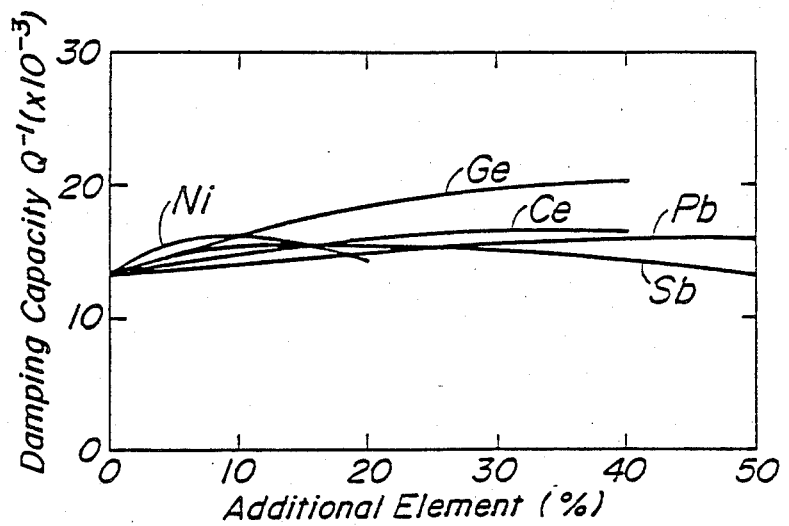
FIG. 4 is a characteristic diagram showing the relation between damping capacity $Q^{-1}$ of Al-3% Si alloy and the content of additional elements of Pb, Sb, Ge, Ce and Ni.

The addition effect of each additional element of lead (Pb), antimony (Sb), germanium (Ge), cerium (Ce), and nickel (Ni) on the increase of the damping capacity $Q^{-1}$ of Al-3% Si alloy is shown in FIG. 4.

Figure 5:
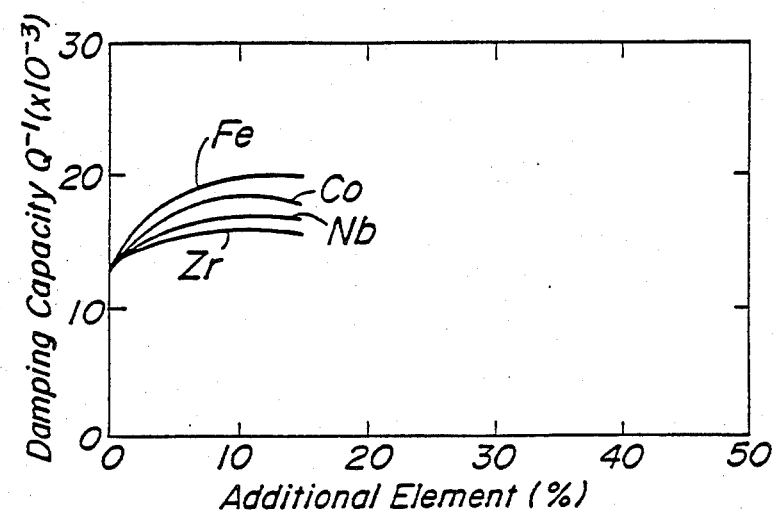
FIG. 5 is a characteristic diagram showing the relation between damping capacity $Q^{-1}$ of Al-3% Si alloy and the content of additional elements of Co, Fe, Nb and Zr.

The addition effect of each additional element of cobalt (Co), iron (Fe), niobium (Nb) and zirconium (Zr) to Al-3% Si alloy is shown in FIG. 5.

Figure 6:
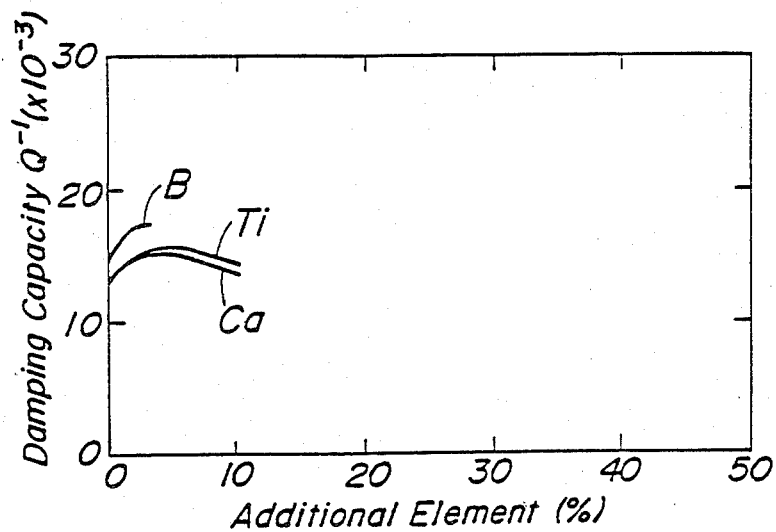
FIG. 6 is a characteristic diagram showing the relation between damping capacity $Q^{-1}$ of Al-3% Si alloy and the content of additional elements of Ti, Ca and B.

The addition effect of each additional element of titanium (Ti), calcium (Ca) and boron (B) to Al-3% Si Alloy is shown in FIG. 6.

Figure 3:
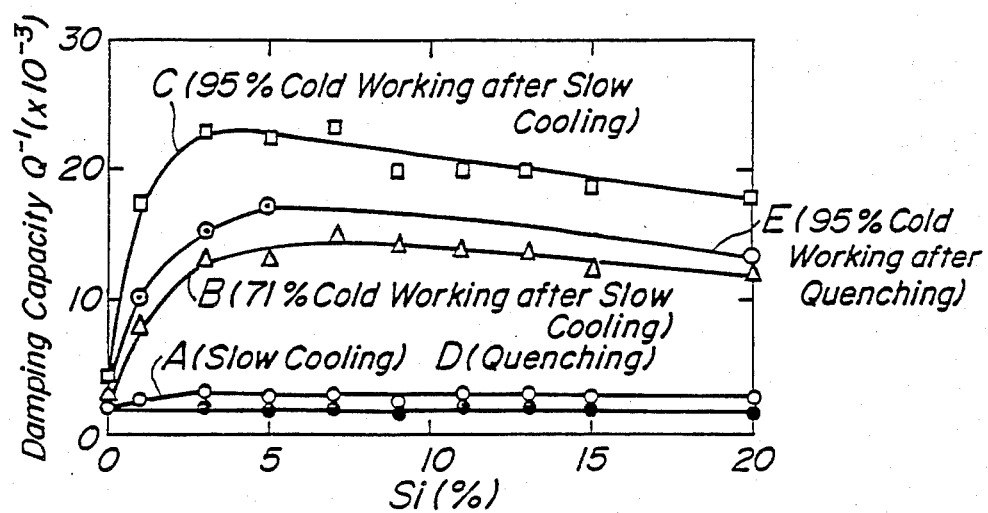
FIG. 3 is a characteristic diagram showing the relation between damping capacity $Q^{-1}$ of Al-Si alloy and the content of silicon.

In FIG. 3, the curve A shows a feature of damping capacity $Q^{-1}$ of Al-Si alloy obtained by slow cooling from 500° C., curves B and C show features of damping capacity $Q^{-1}$ obtained by cold working with a reduction of area of 71% and 95% respectively after slow cooling from 500° C. Curve D shows a feature obtained by quenching from 500° C. as comparative. Curve E shows a feature obtained by cold working with a reduction of area of 95% after quenching from 500° C.

As can be seen from FIG. 3, the damping capacity $Q^{-1}$ of curve A or D by slow cooling or quenching is very small, although it becomes large with additionally applied cold working, while the damping capacity $Q^{-1}$ of pure aluminum is about $2-4 \times 10^{-3}$, and the damping capacity $Q^{-1}$ of Al-Si alloy including 0.5 to 20% silicon subjected to cold working of 71% and 95% is more than $6 \times 10^{-3}$ to $23 \times 10^{-3}$ as shown in Table 1 and FIG. 3.

The reason for the limitation of composition of the alloy to the invention is as follows. According to the present invention, silicon as well as at least one subingredient selected from lead, antimony, germanium, cerium, nickel, cobalt, iron, niobium, zirconium, titanium, calcium and boron within their upper limit contribute not only to the improvement of the damping capacity $Q^{-1}$ and workability, but also to the improvement of strength. An exception is lead which does not improve strength. The excess addition of a subingredient, except lead, to Al-Si alloy causes the alloy to be unworkable. The effects of the various elements of the damping alloy according to the claimed invention are set forth in the following table:

| Element in Al–Si alloy | in wt % | Damping capacity Suitable amount | Damping capacity Excess amount | Mechanical strength Suitable amount | Mechanical strength Excess amount | Workability Suitable amount | Workability Excess amount |
|---|---|---|---|---|---|---|---|
| Si | 0.3-20% | o | (x) | o | (o) | o | (x) |
| Pb | 30% | o | (o) | x | (x) | o | (o) |
| Sb | 30% | o | (x) | o | (o) | o | (x) |
| Ge | 40% | o | (x) | o | (o) | o | (x) |
| Ce | 20% | o | (x) | o | (o) | o | (x) |
| Ni | 20% | o | (x) | o | (o) | o | (x) |
| Co | 15% | o | (x) | o | (o) | o | (x) |
| Fe | 15% | o | (x) | o | (o) | o | (x) |
| Nb | 15% | o | (x) | o | (o) | o | (x) |
| Zr | 15% | o | (x) | o | (o) | o | (x) |
| Ti | 10% | o | (x) | o | (o) | o | (x) |
| Ca | 10% | o | (x) | o | (o) | o | (x) |
| B | 3% | o | (x) | o | (o) | o | (x) |

Note:
o indicates increase of its features in suitable amount of addition of subingredient.
(x) indicates decrease of its feature in excess amount of addition of subingredient.

In general, damping alloys can be classified according to their mechanism of damping as set forth in the following table:

| Title | Classification of damping capacity alloy — Mechanism of damping capacity | Example |
|---|---|---|
| Compound type | boundary slipping or boundary-migration between grains and grains and adhering movement of the surface between precipitation phase and matrix | flake graphite cast iron, Al—Zn alloy |
| Ferro-magnetic type | movement of magnetic domain due to the external stress applied thereto | 12% Cr steel NIVCO-10 alloy, Fe, Ni, T.D.-nickel |
| Dislocation type | energy loss by the mechanical static hysteresis in the mutual influence of impurity atoms and slipping dislocation | Mg, Mg—0.6% Zr alloy (KIXI)Zn |
| Microtwin boundary type | energy loss due to movement of boundary between martensite phase and matrix thereof or the movement of twin boundary in the thermal elastic martensite over the transformation point | Mn—Cu, Cu—Al—Ni, TINI |

Generally, if a body is made to vibrate, the vibrations are ultimately damped to zero. This is due to the fact that the energy of the vibrations is transformed into heat within the body which is dissipated. The heat is generated by internal friction within the body. An alloy having high damping capacities is associated with high values of internal friction. As set forth in the table above, the mechanisms of internal friction are classified into compound type, ferro-magnetic type, domain moving or dislocation type, and twin domain or micro-twin boundary type. The alloy of the claimed invention belongs to dislocation type. The high damping capacity of the damping alloy of the claimed invention results from the fact that the energy of vibration is dissipated through dislocations due to slipping or movement by the mechanical static hysteresis in the mutual influence of impurity atoms and slipping or migration in the grain boundary and adhesive movement of the surface between phase and matrix. That is, the damping mechanism of the damping alloy of the claimed invention is quite different from that of ferro-magnetic type damping alloys. Conventionally, the theory of mechanical damping due to dislocation may be explained by reference to FIG. 7.

Figure 7:
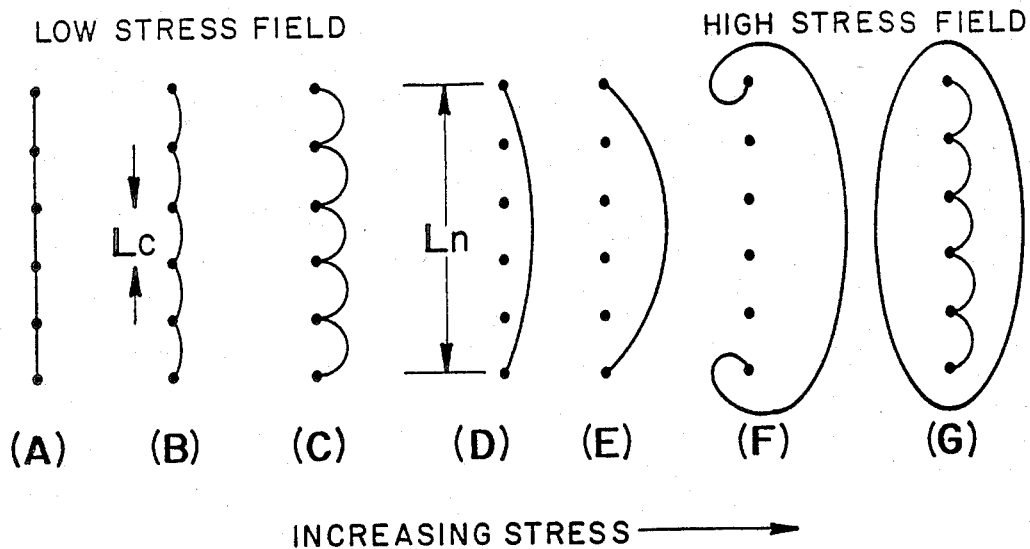
FIG. 7 is a characteristic diagram showing successive drawings which schematically indicate the bowing out of a pinned dislocation line by an increasing applied stress.

The successive drawings in FIG. 7 indicate schematically the bowing out of a pinned dislocation line by an increasing applied stress. The length determined by impurity pinning is denoted by $L_c$, and determined by the network by $L_N$. As stress increases, the $L_c$ bow out until breakaway occurs. For very large stresses, the dislocation is multiplied according to the Frank-Read mechanism. It is assumed that a pure single-crystal contains, prior to deformation, a network of dislocations, such as Mott assumed in his paper on work-hardening. For large enough concentrations of impurity atoms, the length will be determined by the intersection of the network loops further pinned down by the impurity particles through the Cottrell mechanism. Such a model was used by Friedel to describe the anomaly in the rigidity modulus copper alloys for small concentrations found by Bradfield and Pursey. There are, therefore, two characteristics lengths in the model: the network length $L_N$ and the length $L_c$, determined by the impurities. The model is further modified mathematically to take account of the fact that distribution of lengths occurs.

Figure 8:
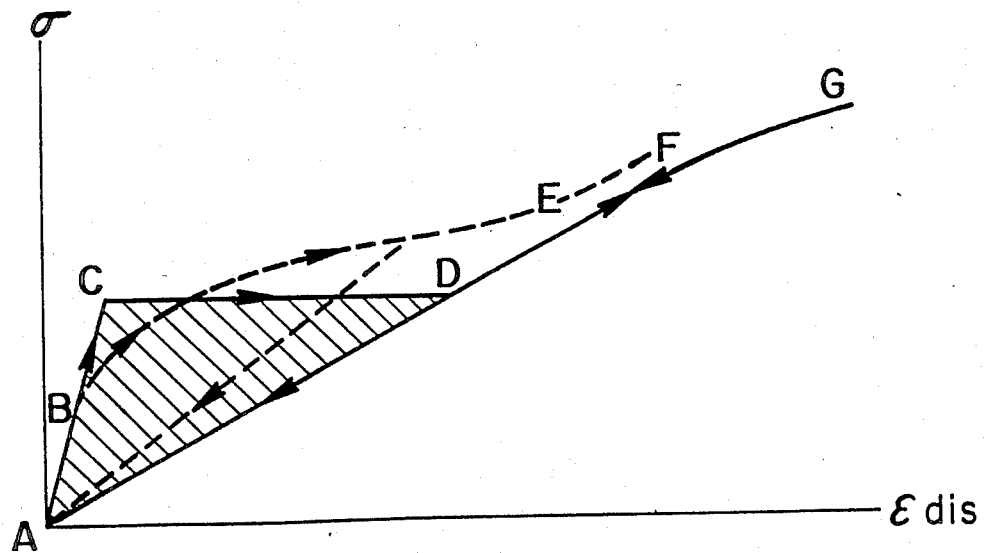
FIG. 8 is a characteristic diagram showing the stress strain law that results for the model shown in FIG. 7.

If an external stress is now applied, there will be, in addition to elastic strain, an additional strain due to the dislocations, which strain is referred to as dislocation strain. The stress-dislocation strain law is, in general, a function of frequency. However, as will be shown, it is independent of frequency for lower frequencies including the kilocycle range (quasi-static behavior). Qualitatively, the action of a dislocation length under the influence of an increasing external stress can be seen from FIG. 1. For zero applied stress the length $L_N$ is pinned down by the impurity particles (A). For a very large stress (V) the loops ($L_c$) bow out and continue to bow out until breakaway stress is reached. The effective modulus of the stress-dislocation strain curve is determined by $L_c$ in this range. At breakaway stress, a large increase in the dislocation strain occurs for no increase in the stress (C-D). Now, for further increase in the stress, the loop length ($L_N$) bows out (D-E) until the stress required to activate the Frank-Read source ($L_N$) is reached. It is assumed that the network pinning is so strong that no breakaway of network lengths occurs. In this interval (D-E), the effective modulus is determined by the length $L_N$. Further increases in the applied stress lead to the creation and expansion of new dislocation loops (F-G). The dislocation strain due to this process is known to be irreversible and may be referred to as plastic strain. From the foregoing illustration, and the analysis with its modifications which follow, a qualitative picture of the stress-dislocation strain now may be obtained. In FIG. 8, the stress-dislocation law corresponding to the above model is shown.

It is apparent that the losses are made up of two different types. The first loss is due to the fact that the measurement is a dynamic one. Because the motion forced by the external stress if opposed by some damping mechanism, there is a phase leg or an oscillating stress, and hence a decrement and change of modulus. This type of loss is frequency dependent, since it has a resonance type character. It is largest near the resonance frequency determined by a loop length, and goes to zero for very low and very high frequencies.

The second type loss is due to the fact that during the unloading part of the stress cycle (D-A), the long loops collapse elastically along a path determined by the long loop length, thus giving a hysteresis loop. When the loops have completely collapsed they are again pinned by the impurity particles and the same type of path is followed in the other half cycle. This loss is simply proportional to the area enclosed by the stress-dislocation strain loop. For small stresses, it does not occur. Because of the fact that, in the frequency range considered, the stress-dislocation strain law is independent of frequency, this loss is frequently independent.

The solid line in FIG. 8 shows the stress strain law that results for the model shown in FIG. 7. The elastic strain has been substracted out so that only the dislocation strain is shown. The path ABCDEF is followed for increasing stress, while the path FA is followed for decreasing stress. The dashed line curve is that which would result if not all of the loops have the same length, but there is a distribution of length $L_c$.

The damping mechanism of the alloy of the claimed invention is as follows.

The solubility limit of silicon in aluminum is less than 0.05% in room temperature. Thus, the heat treated aluminum silicon alloy is composed of the mixture of aluminum phase and silicon phase crystallized. If the cold working is applied to the heat treated aluminum silicon series alloy, the dislocation is simultaneously introduced into the crystal lattice of the aluminum silicon alloy. The silicon and additional element atoms crystallize in the matrix of said aluminum phase act as pinning against the movement of dislocation when the vibrational stress is applied to the aluminum silicon damping capacity alloy, therefore, the hysteresis loop is caused in the stress-strain curve. This hysteresis causes the damping capacity $Q^{-1}$. This pinning is known in conventional Grant-Lucke theory. *Journal of Applied Physics*, Vol. 27, No. 6, June 1956. This hysteresis causes the damping. Dislocations in grain structure are increased by cold working, and damping capacity $Q^{-1}$ becomes large due to the hysteresis mentioned.

If the silicon content becomes less than 0.3% by weight, the damping capacity becomes less than $6 \times 10^{-3}$ and a damping capacity $Q^{-1}$ of not less than $6 \times 10^{-3}$ cannot be attained. As can be seen from FIG. 3, the damping capacity $Q^{-1}$ becames large as the silicon content increases, it reaches a peak of about $23 \times 10^{-3}$ in about 3% of silicon content, and the damping capacity $Q^{-1}$ slowly decreases to $18-20 \times 10^{-3}$ with the content of 20% silicon. Al-Si alloy with silicon content in excess of 20% becomes too difficult to apply cold working to, and, more specifically, mechanical strength becomes so small that it is not preferable to attain the object of the present invention. Therefore, the content of silicon is limited to 0.3 to 20% (preferably 1 to 20%) by weight.

FIG. 4 shows the increase of damping capacity $Q^{-1}$ as an increase of additional element of Pb, Sb, Ge, Ce or Ni in Al-3% Si alloy is subjected to cold working according to the present invention. As can be seen from FIG. 4, the cold working becomes impossible when the amount of the addition of Pb, Sb is in excess of 50% by weight and the addition of Ge, Ce, Cu is in excess of 40% by weight and the addition of Ni is in excess of 20% by weight. Therefore, the content of Pb and Sb is limited to not more than 50% and the content of Ge, Ce is limited to not more than 40% and the content of Ni is limited not more than 20% by weight respectively.

FIG. 5 illustrates the increase of damping capacity $Q^{-1}$ as increase of additional element of Co, Fe, Nb and Zr in Al-3% Si alloy subjected to 71% cold working according to the present invention. As can be seen from FIG. 5, the cold working becomes impossible when the amount of the addition of Co, Fe, Nb and Zr is in excess of 15% by weight. Therefore, the content of Co, Fe, Nb and Zr is limited to not more than 15% by weight.

FIG. 6 illustrates the increase of damping capacity $Q^{-1}$ as increase of additional element of Ti, Ca and Boron (B) in Al-3% Si alloy subjected to 71% cold working according to the present invention. As can be seen from FIG. 6, the cold working becomes impossible with the addition of Ti or Ca in excess of 10% or the addition of boron in excess of 3%. Therefore, the content of Ti, Ca is limited to not more than 10% and the content of boron is limited to not more than 3% by weight.

The essential factors for obtaining a high damping alloy are as follows:

(a) composition,
(b) heat treatment,
(c) cold working.

If a particular composition does not fall within suitable composition range, high damping capacity will not be obtained. However, even if the composition falls within the appropriate range, if appropriate heat treatment is not selected, high damping capacity will also not be obtained. Further, even if the composition and the heat treatment are appropriately selected and applied, if appropriate cold working is not applied, high damping capacity will not be obtained either.

The alloys according to the present invention are characterized by having a high damping capacity, a light weight, a good cold workability, and a non-ferromagnetic property. Therefore, the alloys according to the present invention are very suitable and useful for the prevention of vibration and noise as well as to save weight when used in various vehicles and large size machines, movable parts of electronic instruments, magnetic field functioning parts, various household articles, building materials and the like.

What is claimed is:

1. A process for producing a damping alloy having a high damping capacity, comprising:

heating an alloy consisting of 1-20% by weight of silicon, 0.1-15% by weight of iron, 0.1-50% by weight in total of at least one subingredient selected from the group consisting of less than 50% by weight of lead and antimony, less than 40% by weight of germanium and cerium, less than 20% by weight of nickel, less than 15% by weight of cobalt, niobium and zirconium, less than 10% by weight of titanium and calcium and less than 3% by weight of boron, and the remainder of aluminum, at a temperature higher than 250° C. and lower than its melting point for 5 minutes to 500 hours to achieve homogeneity of said alloy;

cooling at a cooling rate of 200° C./sec to 1° C./hr to maintain said homogeneity;

subjecting to a cold working with a reduction of area of at least 5%; and reheating said alloy sufficiently to facilitate subsequent forming at a temperature of less than 250° C. for more than 1 minute to less than 100 hours and then cooling at a rate of not less than 1° C./hr, whereby said damping capacity is made not less than $6 \times 10^{-3}$.

2. A damping alloy having high damping capacity of not less than $6 \times 10^{-3}$, made according to the process of claim 1.

3. A process for producing a damping alloy having a high damping capacity, comprising:

heating an alloy consisting of 1-20% by weight of silicon, 0.1-15% by weight of iron, 0.1-50% by weight in total of at least one subingredient selected from the group consisting of less than 50% by weight of lead and antimony, less than 40% by weight of germanium and cerium, less than 20% by weight of nickel, less than 15% by weight of cobalt, niobium and zirconium, less than 10% by weight of titanium and calcium and less than 3% by weight of boron, and the remainder of aluminum, at a temperature higher than 250° C. and lower than its melting point for 5 minutes to 500 hours to achieve homogeneity of said alloy;

cooling at a cooling rate of not more than 1° C./sec to maintain said homogeneity;

subjecting to cold working with a reduction of area of at least 5%; and reheating said alloy sufficiently to facilitate subsequent forming at a temperature of less than 250° C. for more than 1 minute to less than 100 hours and then cooling at a rate of not less than 1° C./hr; whereby said damping capacity is made not less than $6 \times 10^{-3}$.

4. A damping alloy product having a high damping capacity of not less than $6 \times 10^{-3}$, comprising an alloy consisting of 1-20% by weight of silicon, 0.1-15% by weight of iron, 0.1-50% by weight in total of at lest one subingredient selected from the group consisting of less than 50% by weight of lead and antimony, less than 40% by weight of gernamium and cerium, less than 20% by weight of nickel, less than 15% by weight of cobalt, niobium and zirconium, less than 10% by weight of titanium and calcium and less than 3% by weight of boron, and the remainder of aluminum, said alloy having been processed by the combination of:

heating said alloy at a temperature higher than 250° C. and lower than its melting point for 5 minutes and less than 500 hours to achieve homogeneity of said alloy;

cooling at a cooling rate of not more than 1° C./sec to maintain said homogeneity;

subjecting to a cold working with a reduction of area of at least 5%; and reheating said alloy sufficiently to facilitate subsequent forming at a temperature of less than 250° C. for more than 1 minute to less than 100 hours and then cooling at a rate of not less than 1° C./hr.

* * * * *